United States Patent
Zimmermann et al.

(10) Patent No.: US 6,403,214 B1
(45) Date of Patent: Jun. 11, 2002

(54) ADHESIVE TAPE STRIP AND ITS USE

(75) Inventors: Dieter Zimmermann, Jork; Harald Kehler; Walter Schulze, both of Hamburg, all of (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/356,181

(22) Filed: Jul. 16, 1999

(30) Foreign Application Priority Data

Jul. 23, 1998 (DE) .......................................... 198 33 174

(51) Int. Cl.⁷ ............................................. B32B 15/04
(52) U.S. Cl. ...................................................... 428/343
(58) Field of Search .......................................... 428/343

(56) References Cited

U.S. PATENT DOCUMENTS 5,491,012 A    2/1996  Luhmann et al. ............. 428/40

FOREIGN PATENT DOCUMENTS

| DE | 42 22 849 | 6/1993 |
|---|---|---|
| DE | 196 11 501 | 9/1997 |
| WO | 92/11333 | 7/1992 |

*Primary Examiner*—Terressa M. Boykin
(74) *Attorney, Agent, or Firm*—Norris McLaughlin Marcus

(57) ABSTRACT

Double-sided adhesive tape strip for rereleasable adhesive bonds, comprising an adhesive composition based on a) thermoplastic rubber and
    b) tackifying resins, the adhesive tape possessing
    c) high elasticity and
    d) low plasticity and
    e) the adhesion being lower than the cohesion,
    f) the adhesion largely disappearing when the tape is extended,
    g) the ratio of peel force to tensile strength being 1:1.5 or more, and
    h) an adhesive bond produced therewith being detachable by pulling on the adhesive tape in the direction of the bond plane, characterized in that
    i) the adhesive composition comprises an admixed reactive resin.

16 Claims, No Drawings

ADHESIVE TAPE STRIP AND ITS USE

The invention relates to a double-sided adhesive tape strip and to its use for structural bonds which despite meeting a high profile of requirements are easy to separate again.

Adhesive tapes for structural bonds are known and are obtainable commercially. Bonds produced with them, however, are almost impossible to separate again without destroying or damaging the substrates. Adhesive tapes for reversible bonds are likewise known and obtainable commercially. In particular, adhesive tapes for rereleasable bonds, which can be released again by pulling in the direction of the bond plane, are known and are obtainable commercially under the designation "tesa Power-Strips". Bonds produced using such products offer a powerful hold and can be removed again without trace and without damaging the substrate or the adherends, as is described in DE 33 31 016 C2. The strength levels which can be achieved, however, are not adequate for structural bonds.

DE 3714453, DE 4222849, DE 4233604, DE 4339604, DE 4428587, DE 4431914 and DE 19511288 describe specific embodiments and applications of the abovementioned adhesive tapes. Stringent requirements are made of the adhesive tapes described in these documents; for instance:

In order to function flawlessly they must offer a tack which is sufficient for the particular application (for ease of bonding=low application pressure, and for immediate load bearing) and bond strength (during the period of the application).

Prerequisites for the detachment process are high extensibility coupled with low extensional stress and a tensile strength which is high in comparison with the detachment force (stripping force).

A marked reduction in tack on stretching is advantageous for the detachment process.

Appropriate ageing resistance in the bonded joint is essential for relatively long-term bonds.

Under high mechanical stresses (high shear and tip-shear loads), when using unsaturated styrene block copolymers (styrene, isoprene and styrene-butadiene block copolymers), ozone cracks may develop in the adhesive which may in turn cause the adhesive tapes to tear during the detachment process or may lead to the bonded article becoming detached during the period of application.

Especially in the case of bonds subject to high shear and tip-shear loads, high thermal shear strength is essential for sufficient bond strength at application temperatures of >about 35° C.

For many applications there is a requirement that the adhesive tape be pigmented. The use of pigments, such as $TiO_2$, however, can have an adverse effect on the bond strength, especially when used in high concentrations. These adhesive tapes, however, are also inadequate for structural bonds.

Bonds which are rereleasable without destruction, using products in accordance with DE 33 31 016 (e.g. Power-Strips) produce strengths in the range of 1–2 kg (according to BDF testing: JO PMX 100, tip-shear durability test) and shear strengths of 30–40 $N/cm^2$ (according to BDF—bond strength JO PM 0020). In order to reach the range of structural adhesive bonds which can be rereleased without destruction, higher values are required.

DE 33 31 016 C2, however, has also already disclosed adhesive tapes of the type described whose adhesive composition has been formulated so as to be heat-activatable. It has therefore disclosed products which, like a hot-melt, do not bond at room temperature but do bond under heat. With these products too it is impossible to obtain strengths sufficient for structural adhesives.

The object of the invention was therefore to attain the profile of requirements set out above (especially>100 $N/cm^2$ shear strength) while at the same time permitting easy detachment of the adhesive bond.

This object is achieved by an adhesive tape strip as defined more closely in the claims.

In particular, the use of reactive resin, preferably in combination with magnesium oxide, in combination with heat curing from the formulations of DE 33 31 016, produces a structural adhesive tape with a certain fixing aid, which is therefore particularly suitable for use in practice.

Particularly suitable bonds are those having spacers on at least one substrate, as is described in DE 196 37 223 A1. If bonding is carried out with 0.5 mm spacers, the assembly (e.g. metal/glass) lends itself particularly well to stripping on smooth surfaces; in other words, it can be separated easily and without residue or destruction.

Particularly suitable in accordance with the invention as reactive resins are alkylphenol resins which are in particular base-reactive, as marketed as polychloroprene-based adhesives, for example as Alresen® PA 565 (Hoechst).

The invention will be illustrated below using examples but without wishing unnecessarily to restrict it.

EXAMPLE 1

In one formulation the reactive alkylphenol resin (Alresen PA 565) from Hoechst was employed (together with Pentalyn H from Hercules); all figures are in parts by weight:

| | |
|---|---|
| 53.5 Cariflex TR 1101 | Shell |
| 25.2 Pentalyn H | Hercules |
| 16.9 Alresen PA 565 | Hoechst |
| 2.2 Kronos 2160 - $TiO_2$ | Kronos |
| 2.2 Maglite DE - MgO | Merck |

Preparation was carried out without Alresen PA 565 at 180° C. in an extruder with introduction of $CO_2$. The mixture was then cooled to 150° C. and Alresen PA 565 was added and briefly incorporated homogeneously. The composition was extruded to form a 0.8 mm thick tape which was lined with release paper on one side, cut into rolls and punched into strips (2×5 cm). The tensile strength of this formulation was:

about 160 N/cm (in accordance with BDF tensile test procedure JO PMC 001, test specimens in accordance with DIN EN 20527/2)

Formulations without Alresen 565 (with Pentalyn H instead) gave values of about 60 $N/mm^2$ under the same conditions. Sample bonds of wood/wood and steel/unplasticized PVC (at 180° C./3 minutes under the gentle pressure of a heated press) gave bond strengths of about 120 $N/cm^2$, which are therefore within the range of structural adhesives (tesa-Power Strip strengths are of the order of magnitude of 30–40 $N/cm^2$).

A metal plate bonded using an iron (linen setting, about 180° C.) for 1 minute showed very good tip-shear durability for a 4 kg load (RT); at 140° C., loads of 1 kg are still held. The formulation without a reactive resin withstands a 1 kg load at up to 80° C.

The same bond combined with the tesa Systemhaken [hook] was able to withstand a load of 16 kg for a prolonged period (4 weeks).

What is claimed is:

1. A double-sided adhesive tape strip comprising an adhesive composition based on thermoplastic rubber and tackifying resins, wherein the adhesive composition also comprises an admixed reactive resin, and wherein the adhesive tape strip exhibits the following properties:
   a) high elasticity;
   b) low plasticity;
   c) an adhesion lower than its cohesion;
   d) an adhesion which largely disappears when the tape is extended; and
   e) a ratio of peel force to tensile strength of 1:1.5 or more;
and the adhesive tape can be bonded to a substrate and released therefrom by pulling on the adhesive tape in the direction of the plane of the bond formed between the adhesive tape and the substrate.

2. Adhesive tape strip according to claim 1, wherein the reactive resin is a reactive alkylphenol resin.

3. Adhesive tape strip according to claim 1, wherein the reactive resin is a heat-activatable resin.

4. Adhesive tape strip according to claim 1, wherein the reactive resin makes up from 10 to 30% by weight of the adhesive composition.

5. Adhesive tape strip according to claim 1, wherein the reactive resin is employed together with a metal oxide.

6. Adhesive tape strip according to claim 5, wherein the metal oxide makes up from 1 to 3% by weight of the adhesive composition.

7. Adhesive tape strip according to claim 1, wherein the composition has been formulated to be self-adhesive.

8. Adhesive tape strip according to claim 1, comprising antioxidants, UV stabilizers, colorants, fillers and/or other customary auxiliaries.

9. Adhesive tape strip according to claim 1, having a thickness of from 0.4 mm to 0.8 mm.

10. Adhesive tape strip according to claim 1, comprising as thermoplastic rubber a styrene-butadiene block polymer and as tackifying resin a rosin derivative.

11. Adhesive tape strip according to claim 1, where the ratio of peel strength to tensile strength is from 1:2 to 1:3.

12. Adhesive tape strip according to claim 1, wherein a hot mixture of base materials is kneaded and extruded.

13. Adhesive tape strip according to claim 4, wherein the reactive resin makes up from 15 to 25% by weight of the adhesive composition.

14. Adhesive tape strip according to claim 5, wherein the reactive resin is employed together with magnesium oxide.

15. Adhesive tape strip according to claim 6, wherein the metal oxide makes up from 1.5 to 2.5% by weight of the adhesive composition.

16. A method of forming a structural bond between an adhesive tape strip and a substrate and thereafter releasing the bond, said method comprising:
   a) providing an adhesive tape strip according to any one of claims 2–12, 1 and 13–15;
   b) applying the adhesive tape strip to the substrate to form a structural bond between the adhesive tape strip and the substrate; and
   c) releasing the structural bond by pulling on the adhesive tape strip in the direction of the plane of the bond formed between the adhesive tape strip and the substrate.

* * * * *